(12) United States Patent
Wu

(10) Patent No.: US 11,452,128 B2
(45) Date of Patent: Sep. 20, 2022

(54) METHOD FOR UPLINK TRANSMISSION IN A 5G NR SYSTEM

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/771,638

(22) PCT Filed: Jan. 6, 2020

(86) PCT No.: PCT/US2020/012381
§ 371 (c)(1),
(2) Date: Jun. 10, 2020

(87) PCT Pub. No.: WO2020/146265
PCT Pub. Date: Jul. 16, 2020

(65) Prior Publication Data
US 2020/0404691 A1    Dec. 24, 2020

Related U.S. Application Data

(60) Provisional application No. 62/791,599, filed on Jan. 11, 2019.

(51) Int. Cl.
*H04W 72/12* (2009.01)
*H04W 76/11* (2018.01)
(Continued)

(52) U.S. Cl.
CPC ....... *H04W 72/1284* (2013.01); *H04L 1/1819* (2013.01); *H04W 28/0278* (2013.01);
(Continued)

(58) Field of Classification Search
None
See application file for complete search history.

(56) References Cited

U.S. PATENT DOCUMENTS 10,218,422 B2    2/2019  Raghavan et al.
11,039,302 B2 *  6/2021  Chang ............... H04W 72/1268
(Continued)

FOREIGN PATENT DOCUMENTS

JP    2018523378    8/2018
WO    2017172165    10/2017
(Continued)

OTHER PUBLICATIONS

"Foreign Office Action", TW Application No. 109100889, dated Aug. 21, 2020, 20 pages.
(Continued)

*Primary Examiner* — Anh Vu H Ly
(74) *Attorney, Agent, or Firm* — Colby Nipper PLLC

(57) ABSTRACT

Methods for handling uplink transmissions between a user equipment (UE) and a base station in a 5G NR system are described. In implementations, a UE (110) receives, from the base station (120), a first radio resource control message (505) that includes a network-set SkipUplinkTxDynamic field indicating a first configuration for a skip uplink transmission function. The UE determines, regardless of the network-set SkipUplinkTxDynamic field, a user-equipment-set SkipUplinkTxDynamic field (510) that indicates a second configuration for the skip uplink transmission function. The UE transmits, to the base station, a radio resource complete message (515) that includes an indicator of the user-equipment-set SkipUplinkTxDynamic field to override the network-set SkipUplinkTxDynamic field. Afterwards, in various implementations, the UE processes uplink transmissions using the second configuration for the skip uplink transmission function.

26 Claims, 8 Drawing Sheets

(51) Int. Cl.
| | |
|---|---|
| *H04W 76/27* | (2018.01) |
| *H04L 1/18* | (2006.01) |
| *H04W 28/02* | (2009.01) |
| *H04W 72/14* | (2009.01) |
| *H04W 80/02* | (2009.01) |

(52) U.S. Cl.
CPC ............ *H04W 72/14* (2013.01); *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2017/0289995 A1* | 10/2017 | Lin | H04W 72/0446 |
| 2018/0139734 A1* | 5/2018 | Babaei | H04W 72/0406 |
| 2018/0160445 A1 | 6/2018 | Babaei et al. | |
| 2019/0158233 A1 | 5/2019 | Lee et al. | |
| 2019/0182855 A1 | 6/2019 | Babaei et al. | |
| 2020/0053586 A1* | 2/2020 | Kim | H04W 72/1289 |
| 2021/0014887 A1* | 1/2021 | Lou | H04L 5/0053 |

FOREIGN PATENT DOCUMENTS

| | | |
|---|---|---|
| WO | 2018064615 | 4/2018 |
| WO | 2018186137 | 10/2018 |
| WO | 2018198851 | 11/2018 |
| WO | 2018130115 | 7/2019 |

OTHER PUBLICATIONS

"Correction to Test Case 7.1.4.1a for Layer 2 Latency Reduction", 3GPP TSG5 RAN meeting #79, Busan, Korea, May 21-25, 2018, May 2018, 4 pages.
"ETSI TS 136 321 V15.2.0", LTE; Evolved Universal Terrestrial Radio Access (E-UTRA); Medium Access Control (MAC) protocol specification (3GPP TS 36.321 version 15.2.0 Release 15), Jul. 2018, 128 pages.
"International Search Report and Written Opinion", PCT Application No. PCT/US2020/012381, dated Mar. 17, 2020, 16 pages.
"TP on Default and Specified Configuration", 3GPP TSG-RAN WG2 NR AH1807 Meeting, Montreal, Canada, Jul. 2-6, 2018, Jul. 2018, 8 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Wu, "Handling Overheating in a Wireless-Communication Device", Technical Disclosure Commons; Retrieved from https://www.tdcommons.org/dpubs_series/2343, Jul. 12, 2019, 22 pages.
"Preliminary Report on Patentability", Application No. PCT/US2020/012381, dated Jun. 16, 2021, 9 pages.
"Correction to test case 7.1.4.1a for Layer 2 Latency Reduction", 3GPP TSG5 RAN meeting #79—R5-183061, May 2018, 4 pages.
"Foreign Office Action", KR Application No. 10-2020-7019937, dated Nov. 15, 2021, 11 pages.
"Foreign Office Action", JP Application No. 2020-536795, dated Nov. 24, 2021, 11 pages.
"Foreign Office Action", EP Application No. 20702549.5, dated May 24, 2022, 8 pages.
"Foreign Office Action", KR Application No. 10-2020-7019937, dated May 25, 2022, 11 pages.

* cited by examiner

900

Transmit, to user equipment a first radio resource control message that includes a network-set SkipUplinkTxDynamic field indicating a first configuration for a skip uplink transmission function
905

Receive, from the user equipment a radio resource complete message that includes an indicator of a user-equipment-set SkipUplinkTxDynamic field that specifies a second configuration for the skip uplink transmission function
910

Exchange communications with the user equipment based on using the second configuration for the skip uplink transmission function
915

Fig. 9

METHOD FOR UPLINK TRANSMISSION IN A 5G NR SYSTEM

BACKGROUND

The evolution of wireless communication to Fifth Generation New Radio (5G NR) standards and technologies provides higher data rates and greater capacity with improved reliability and lower latency, which enhances mobile broadband services. 5G technologies also provide new classes of service for vehicular networking, fixed wireless broadband, and the Internet of Things (IoT).

Use of 5G NR technologies, however, presents certain challenges, such as those involving the allocation of air interface resources. The specifications and standards for 5G NR systems allow for uplink transmissions between a User Equipment (UE), such as a smart phone, and a gNodeB (gNB) base station to be skipped in certain circumstances, such as when the UE has no data to transmit. This is called a skip uplink transmit function, and helps to conserve the transmission resources of the 5G system and power consumption of the UE. However, the current standards for implementing the skip uplink transmit function can contribute to undesired operation or undesirable allocation of electronic and air interface resources.

In more detail, the current standards that implement the skip uplink transmit function present some possible ambiguities, which can present a misunderstanding between the UE and the gNB regarding this function. If the gNB and UE have different settings regarding this function, the result can be a waste of resources as the UE repeatedly transmits uplink messages when there is actually no data to transmit.

SUMMARY

This summary is provided to introduce simplified concepts for handling uplink transmission in a 5G NR system and configuring a UE to perform uplink transmissions. The simplified concepts are further described in the Detailed Description below. This summary is not intended to identify essential features of the claimed subject matter nor is it intended for use in determining the scope of the claimed subject matter.

Methods for handling uplink transmissions between a user equipment (UE) and a base station in a 5G NR system are described. In implementations, a UE receives, from the base station, a first radio resource control message that includes a network-set SkipUplinkTxDynamic field indicating a first configuration for a skip uplink transmission function. The UE determines, regardless of the network-set SkipUplinkTxDynamic field, a user-equipment-set SkipUplinkTxDynamic field that indicates a second configuration for the skip uplink transmission function. The UE transmits, to the base station, a radio resource complete message that includes an indicator of the user-equipment-set SkipUplinkTxDynamic field to override the network-set SkipUplinkTxDynamic field. Afterwards, in various implementations, the UE processes uplink transmissions using the second configuration for the skip uplink transmission function.

In one or more implementations, a base station transmits, to a user equipment, a first radio resource control message that includes a network-set SkipUplinkTxDynamic field indicating a first configuration for a skip uplink transmission function. Afterward, the base station receives, from the user equipment, a radio resource complete message that includes an indicator of a user-equipment-set SkipUplinkTxDynamic field that specifies a second configuration for the skip uplink transmission function. In various implementations, the base station exchanges communications with the user equipment based on using the second configuration for the skip uplink transmission function.

In one or more aspects, a gNB base station sets a skipUplinkTxDynamic (SUTD) field, the SUTD field governing whether the UE can implement a skip uplink transmission function. The gNB base station transmits a first Radio Resource Control (RRC) message containing the SUTD field to the UE and receives, in response, a first RRC complete message from the UE. The gNB base station recognizes the skip uplink transmission function in accordance with the SUTD field.

In accordance with other aspects, a gNB base station sets a skipUplinkTxDynamic (SUTD) field governing whether the UE can adopt the skip uplink transmission function. The gNB base station transmits a first RRC message containing the SUTD field to the UE, and the gNB base station receives in response a first RRC complete message from the UE and recognizes the skip uplink transmission function in accordance with the SUTD field.

In accordance with one or more aspects, a UE receives a first Radio Resource Control (RRC) message from a gNB base station, the first RRC message including a skipUplinkTxDynamic (SUTD) field governing whether the UE can adopt the skip uplink transmission function. In response, the UE transmits a first RRC complete message to the gNB base station and implements the SUTD function in accordance with the SUTD field. Where the UE does not support the SUTD function, the SUTD status indicator can simply indicate "valid", regardless of the SUTD field sent by the gNB base station. Where the UE supports the SUTD function, the SUTD status indicator can include a user-equipment-set SkipUplinkTxDynamic (UE-set SUTD) field.

BRIEF DESCRIPTION OF THE DRAWINGS

Aspects for handling uplink transmission in a 5G NR system are described with reference to the following drawings. The same numbers are used throughout the drawings to reference like features and components:

FIG. 9 illustrates an example method in accordance with various aspects of handling uplink transmission in a 5G NR system.

DETAILED DESCRIPTION

Overview

Figure 1:
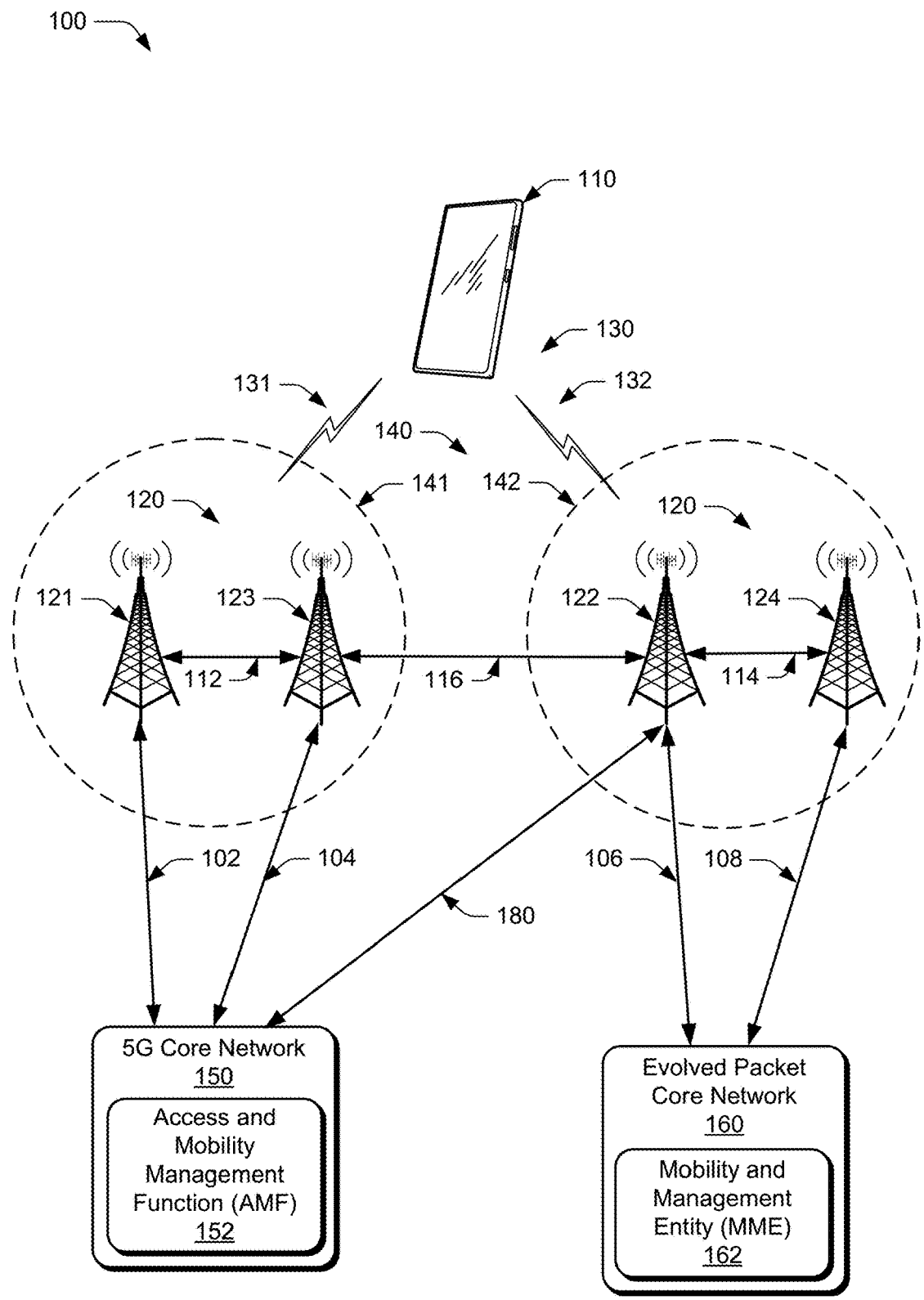
FIG. 1 illustrates an example 5G NR wireless network environment in which various aspects of handling uplink transmissions in a 5G NR system can be implemented.

This document describes methods and devices for handling uplink transmissions in a 5G NR system. The following specifications are incorporated by reference as part of this disclosure:

[1] 3GPP TS 38.331 v15.3.0
[2] 3GPP TS 38.321 v15.3.0
[3] 3GPP TS 38.300 v15.3.0
[4] 3GPP TS 37.340 v15.3.0

The following is an excerpt from 3GPP TS 38.331 v15.3.0, under the heading of MAC-CellGroupConfig field descriptions: "skipUplinkTxDynamic If set to true, the UE skips UL transmissions for an uplink grant other than a configured uplink grant if no data is available for transmission in the UE buffer as described in TS 38.321." For comparison, the following is an excerpt from 3GPP TS 38.321 v15.3.0:

The MAC entity shall not generate a media access control protocol data unit (MAC PDU) for the hybrid automatic repeat request entity (HARQ entity) if the following conditions are satisfied:
the MAC entity is configured with skipUplinkTxDynamic and the grant indicated to the HARQ entity was addressed to a C-RNTI, or the grant indicated to the HARQ entity is a configured uplink grant . . . .

The above specification excerpts demonstrate an ambiguity or what could be considered a possible conflict in the 3GPP specifications. Those of skill in the art will recognize that PDU refers to a Protocol Data Unit.

There are three possible interpretations based on these 3GPP specifications. In a first interpretation ("Interpretation 1"), if a MAC entity of a UE is configured with the skipUplinkTxDynamic (SUTD) field set to false, the MAC entity of the UE receives an uplink grant which is addressed to a cell radio network temporary identifier (C-RNTI) of the UE or which is a configured uplink grant, the MAC entity of the UE will not generate a media access control protocol data unit (MAC PDU). In a second interpretation ("Interpretation 2"), 3GPP TS 38.321 is followed instead of 38.331 no matter what value (true or false) of skipUplinkTxDynamic is configured. In a third interpretation ("Interpretation 3"), 3GPP TS 38.331 is followed instead of 38.321 in the above cases.

These three possible interpretations of the 3GPP specifications raise three potential problems that affect uplink transmissions. A first potential problem is one of interoperability where the UE follows Interpretation 2 but the associated gNB base station follows Interpretation 1. In this case, the UE will not generate a media access control protocol data unit (MAC PDU) according to a configured uplink grant if several conditions are satisfied. Specifically, the UE will not generate a MAC PDU if (1) the skipUplinkTxDynamic (SUTD) field at the UE is set to true, and (2) there is no aperiodic CSI requested for the particular PUSCH transmission (as specified in TS 38.212), and (3) the MAC PDU includes no media access control service data units (MAC SDUs) and (4) the MAC PDU includes only the periodic BSR and (5)(a) there is no data available for any LCG or (5)(b) the MAC PDU includes only the padding BSR.

Without generating the MAC PDU, the UE does not transmit anew signal using the time and frequency resource(s) indicated in the configured uplink grant to the gNB base station. However, the gNB base station configuring the configured uplink grant to the UE expects the UE to transmit a MAC PDU according to the configured uplink grant. Because the gNB base station does not receive the new transmission from the UE in the time and frequency resource(s) indicated in the configured uplink grant, the gNB base station transmits, to the UE, a first uplink grant addressed to the C-RNTI of the UE to request the UE to perform a first retransmission. The UE does not transmit the first retransmission in time and frequency resource(s) indicated in the first uplink grant to the gNB base station because the UE does not generate the MAC PDU for the new transmission. Because the gNB base station does not receive the first retransmission, the gNB base station transmits to the UE a second uplink grant addressed to the C-RNTI of the UE to request a second retransmission. The UE does not transmit the second retransmission in time and frequency resource(s) indicated in the second uplink grant to the gNB base station because the UE does not generate the MAC PDU for the new transmission. The gNB base station repeats requesting the UE to transmit a retransmission several times until the gNB base station either times out or performs the allowed number of retransmission requests.

A second potential problem is a releasing or disabling problem. If the gNB base station cannot configure the UE to not skip an uplink transmission using an RRC after the UE is configured with the "skipUplinkTxDynamic", the skipUplinkTxDynamic is not effectively released or disabled.

A third potential problem stemming from the intersection of 3GPP TS 38.321 and TS 38.331 is one of a potential invalid configuration. This problem can occur when a UE that does not support the skip uplink transmission function receives an SUTD field from a gNB base station. Because, in this case, the UE does not support the skip uplink transmission, the UE determines the SUTD field as an invalid configuration. In response to the determination, the UE initiates an RRC connection reestablishment procedure if the gNB base station is a master gNB (MgNB) or initiates a secondary cell group (SCG) failure information procedure if the gNB base station is a secondary gNB (SgNB). In this case, the connection between the UE and the gNB base station can be needlessly interrupted.

To address these and other potential issues with the skip uplink transmission function, this document describes methods for handling uplink transmissions in a 5G NR system and for configuring a UE to perform uplink transmissions. While features and concepts of the described systems and methods for uplink transmission in a 5G NR system can be implemented in any number of different environments, systems, and/or devices, aspects of these techniques are described in the context of the following example devices and systems.

Example Environment

FIG. 1 illustrates an example environment 100, which includes a user equipment 110 (UE 110) that is configured for connectivity with a 5G NR network using wireless links through one or more gNB base stations. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 can include a downlink of data and control information communicated from the base stations 120 to the UE 110, an uplink of other data and control information communicated from the UE 110 to the base station 120s, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth.

Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Multiple wireless links 131 from the base stations 121 and 123 may be aggregated in dual connectivity (DC) to provide a higher data rate for the UE 110. Multiple wireless links 132 from the base stations 122 and 124 may be aggregated in dual connectivity to provide a higher data rate for the UE 110. Multiple wireless links 130 from the base stations 121 and 122 may be aggregated in a dual connectivity (DC) to provide a higher data rate for the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, a base station 122 in the E-UTRAN 142 may connect to the 5GC 150 and EPC 160 networks.

The base stations 121 and 123 connect, at 102 and 104 respectively, to the 5GC 150 using an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and using an NG3 interface for user-plane data communications, at 180.

In addition to connections to core networks, base stations 120 may communicate with each other. The base stations 121 and 123 communicate using an Xn interface at 112. The base stations 122 and 124 communicate using an X2 interface at 114. The base station 122, which is connected to both the 5GC 150 and the EPC 160, may communicate with the base stations 121 and/or 123 using the Xn interface, as illustrated at 116.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility and Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, using the base stations 120.

For operation of EUTRA-NR dual connectivity (EN-DC), the 5GC 150 is not needed for the base stations 121 and 123. For operation of next-generation (NG) EN-DC, the EPC 160 is not needed for the base stations 122 and 124. For operation of NR-EUTRA dual connectivity (NE-DC), the EPC 160 is not needed for the base stations 122 and 124.

Example Devices

Figure 2:
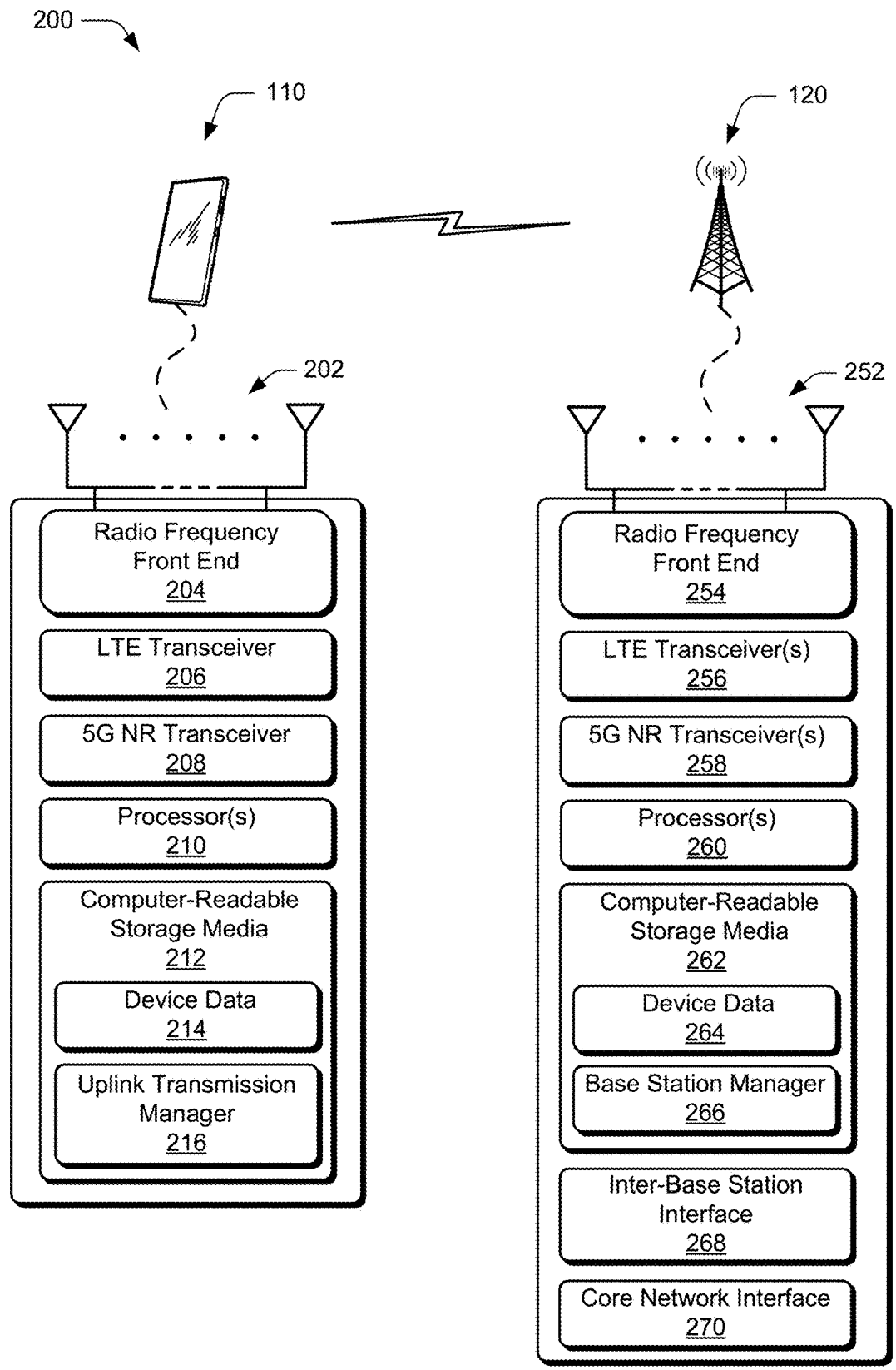
FIG. 2 illustrates an example device diagram for devices that can implement various aspects for handling uplink transmission in a 5G NR system.

FIG. 2 illustrates an example device diagram 200 of the UE 110 and the base stations 120. The UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beam-forming codebooks, applications, and/or an operating system of the UE 110, which are executable by processor(s) 210 to enable user-plane communication, control-plane signaling, and user interaction with the UE 110. The CRM 212 may also include a UE data buffer for storing data for transmission to a gNB that is wirelessly connected to the UE 110.

CRM 212 also includes an uplink transmission manager 216. Alternately or additionally, the uplink transmission manager 216 may be implemented in whole or part as hardware logic or circuitry integrated with or separate from other components of the UE 110. In at least some aspects, the uplink transmission manager 216 configures a Media Access Control layer (e.g., MAC 308 of FIG. 3) to implement the skip uplink transmit function.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

User Plane and Control Plane Signaling

Figure 3:
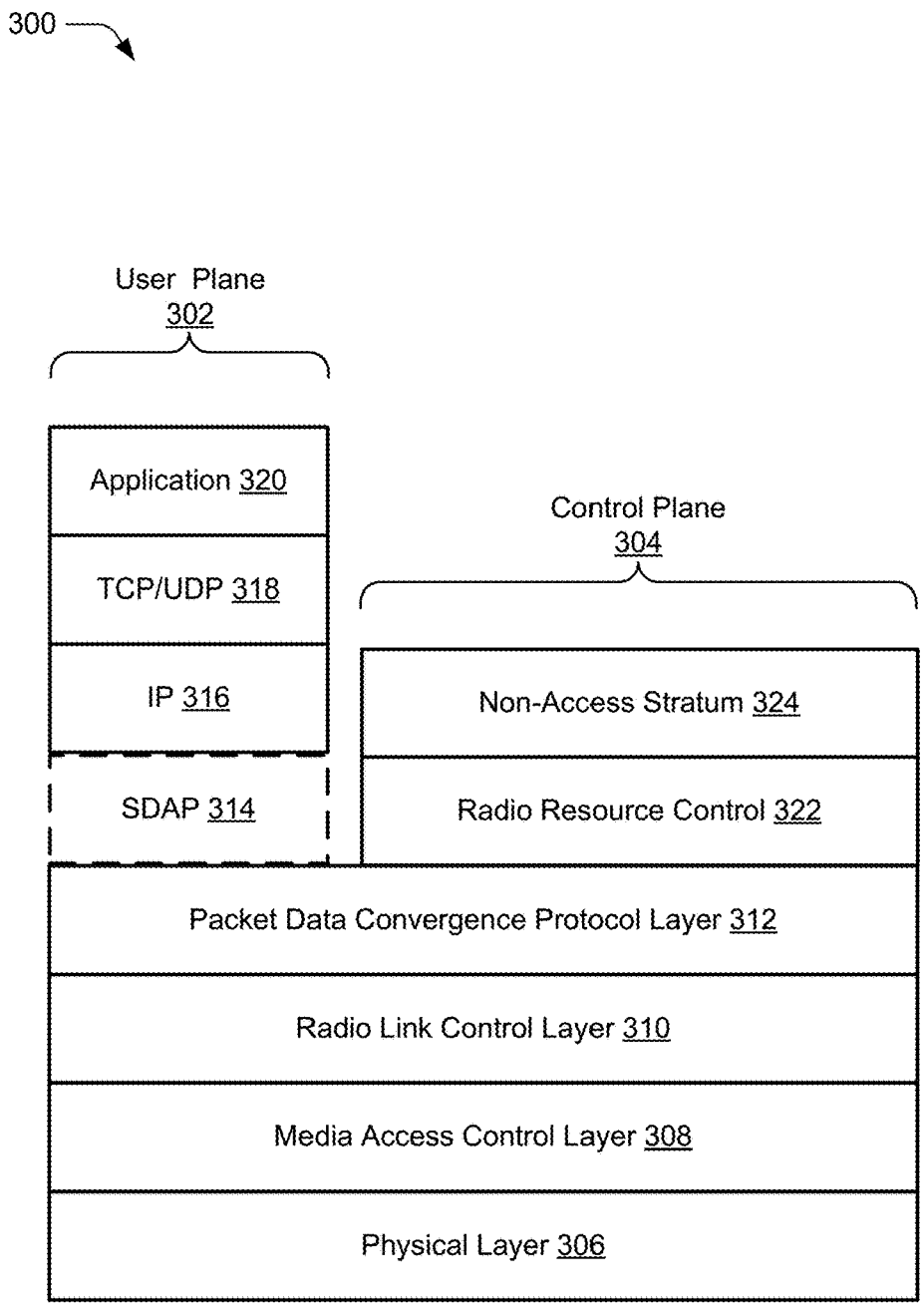
FIG. 3 illustrates an example wireless networking stack with which aspects for handling uplink transmission in a 5G NR system can be implemented.

FIG. 3 illustrates an example block diagram of a wireless network stack model 300 that characterizes a communication system for the example environment 100, in which various aspects for uplink transmission in a 5G NR system can be implemented. The wireless network stack 300 includes a user plane 302 and a control plane 304. Upper layers of the user plane 302 and the control plane 304, share common lower layers in the wireless network stack 300. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The physical layer 306 provides hardware specifications for devices that communicate with each other. As such, the physical layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol. In some cases, such as with 5G NR and E-UTRA networks, the MAC layer 308 can include an E-UTRA MAC and/or an NR MAC (not shown). In other cases, such as for EN-DC, NGEN-DC, and NE-DC, the MAC layer 308 can include an E-UTRA MAC layer and/or an NR MAC layer. In some implementations, a first MAC entity operates functions of the E-UTRA MAC layer for a first Cell Group (CG) and a second MAC entity operates functions of the NR MAC layer for a second CG. In further cases, such as for NR standalone or NR-DC, the MAC layer 308 can include an NR MAC layer. In some implementations, a MAC entity operates functions of the NR MAC layer for a first CG and a MAC entity operates functions of the NR MAC layer for a second CG.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes. In some cases, such as for EN-DC, NGEN-DC, and NE-DC, the RLC layer 310 can include an E-UTRA RLC layer and/or an NR RLC layer.

The PDCP layer 312 provides data transfer services to higher layers in the wireless network stack 300. Generally, the PDCP layer 312 provides transfer of user plane 302 and control plane 304 data, header compression, ciphering, and integrity protection. In some cases, such as for EN-DC, an E-UTRA PDCP layer and an NR PDCP layer may be used.

Above the PDCP layer 312, the wireless network stack splits into the user-plane stack 302 and the control-plane stack 304. The user plane 302 layers include an optional Service Data Adaptation Protocol layer 314 (SDAP 314), an Internet Protocol layer 316 (IP 316), a Transmission Control Protocol/User Datagram Protocol layer 318 (TCP/UDP 318), and an application 320 that transfer data using the wireless link 106. The optional SDAP layer 314 is present in 5G NR networks and maps a Quality of Service (QoS) flow for each data radio bearer and marks QoS flow identifiers in uplink and downlink data packets for each packet data session. The IP layer 316 specifies how the data from the application 320 is transferred to a destination node. The TCP/UDP layer 318 is used to verify that data packets intended to be transferred to the destination node reached the destination node, using either TCP or UDP for data transfers by the application 320.

The control plane 304 includes Radio Resource Control 322 (RRC 322) and a Non-Access Stratum 324 (NAS 324). The RRC 322 establishes and releases connections and radio bearers, broadcasts system information, performs power control, and so forth. As noted herein, the MAC 308 may act to implement techniques for uplink transmission in a 5G NR system. The NAS 324 provides support for mobility management and packet data bearer contexts between the user equipment 110 and entities or functions in the core network, such as the Access and Mobility Management Function 152 (AMF 152), or the Mobility Management Entity 162 (MME 162), or the like.

In the UE 110, each layer in both the user plane 302 and the control plane 304 of the wireless network stack 300 interacts with a corresponding peer layer or entity in a base station 120, a core network entity or function, and/or a remote service, to support user applications and control operation of the UE 110 in the NR RAN 141 or the E-UTRAN 142.

Example Methods

Example signaling and control transaction diagrams 400-600 are described with reference to FIGS. 4-6 in accordance with one or more aspects for handling uplink transmission between a 5G NR system base station (e.g., base station 120) and a User Equipment (UE) (e.g., UE 110), and configuring the UE to perform uplink transmissions. For example, the signaling and control transaction diagrams illustrate interactions between the UE 110 and the base station 120 of FIG. 1, where the interactions can be used to implement one or more aspects of handing uplink transmissions in a 5G NR system.

In the following discussion the terms "skipUplinkTxDynamic field", "SUTD element", "skipUplinkTxDynamic Information Element", "skipUplinkTxDynamic IE", SUTD field", "SUTD", "skipUplinkTx", and "SUT" are used interchangeably, and are to be understood as referring to a specific field associated with the programming of the UE that governs whether the UE can enable the skip uplink transmission function in selected circumstances. Similarly, the term "skip uplink transmission function" is also referred to as the "SUTD function". The terms "adopt" and "implement" are used interchangeably with respect to the SUTD function to indicate whether the SUTD function is utilized. The terms "support" and "recognize" are used in reference to whether a particular element of a 5G NR system (e.g., a UE or gNB) is capable of implementing or adopting the SUTD function.

Figure 4:
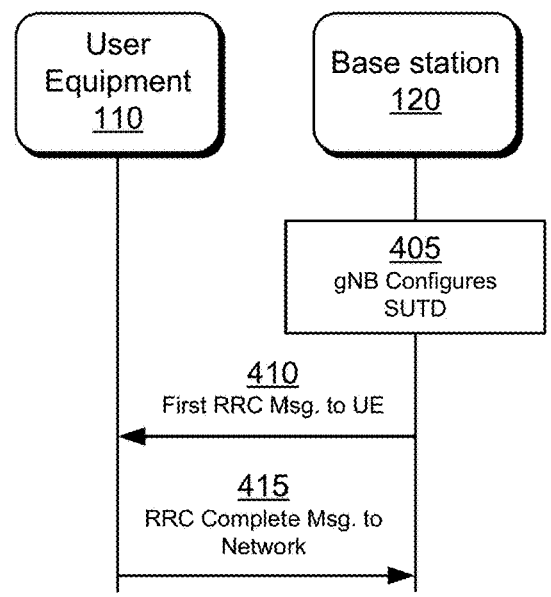
FIG. 4 illustrates an example signaling and control transaction diagram for handling uplink transmissions in a 5G NR system, in which a base station (e.g., a gNB base station) configures the SUTD field, which is received and implemented by a UE, with a first RRC complete message returned to the base station.

FIG. 4 illustrates a signaling and control transaction diagram 400 for handling uplink transmission in a 5G NR system. In implementations, the diagram 400 illustrates transactions performed in a network (e.g., network 140) to provide a solution for problems one and two discussed above. As shown in the diagram 400 of FIG. 4, at 405, the base station 120 (e.g., a gNB base station) configures a SUTD field to communicate to the UE 110. As one example, to direct the UE to enable the skip uplink transmission function, the base station 120 sets the value of the SUTD field in a first RRC message (e.g., an RRC Setup message, an RRC Reconfiguration message, or an RRC Resume message) to "true". As another example, to direct the UE to disable and/or not support the skip uplink transmission function, the base station 120 sets the value of the SUTD field in the RRC message to "false". In implementations, the base station 120 configures a network-set SkipUplinkTransmissionDynamic (network-set SUTD) field.

At 410, the base station 120 (e.g., a gNB base station) transmits the first RRC message to the UE 110, where the first RRC message includes the network-set SUTD. At 415, the base station 120 (e.g., a gNB base station) receives an RRC complete message (e.g., an RRC Setup Complete message, an RRC Reconfiguration Complete message, or an RRC Resume Complete message) from the UE 110. In implementations, the base station 120 identifies and/or recognizes the SUTD function set within the RRC Setup Complete message.

The process outlined in FIG. 4 can proceed in several different ways. In one example, the base station 120 (e.g., a gNB base station) determines to direct or configure the UE 110 to enable the skip uplink transmission function. The base station 120, for instance, receives a capability Information Element (IE), or field, that indicates the UE 110 supports the skip uplink transmission function. As one example, the capability IE (or field) indicating that the UE 110 supports the skip uplink transmission function has the following form:

skipUplinkTxDynamic ENUMERATED {supported} OPTIONAL

Alternately or additionally, the base station 120 receives the capability IE from another gNB base station or a core network function (e.g., the Access and Mobility Management Function 152 in FIG. 1). In response to receiving the capability IE that indicates the UE supports the skip uplink transmission function, the base station determines to direct the UE 110 to enable the skip uplink transmission function. At times, the base station 120 sends the capability IE to the core network function for storage.

In some implementations, the base station 120 (e.g., a gNB base station) determines to direct or configure the UE 110 to disable and/or not support the skip uplink transmission function, such as in scenarios where the base station 120 does not receive a capability IE and/or the base station 120 is not configured to detect whether the UE 110 supports the skip uplink transmission function. As further described, when the base station 120 determines that the UE 110 supports the skip uplink transmission function, the base station transmits the first RRC message to the UE 110. Otherwise, the base station 120 does not transmit the first RRC message to the UE 110, the first RRC message does not include the SUTD field, or the base station 120 sets the SUTD field in the first RRC message to false.

At times, the base station 120 as illustrated in FIG. 4 can be a master gNB (MgNB). The MgNB transmits the first RRC message as illustrated at 405 to the UE using a signaling radio bearer (SRB) associated with the UE 110, where the UE establishes the SRB before receiving the first RRC message. In one example, the base station 120 configures the SRB (e.g., SRB 1) to the UE 110 in a second RRC message (e.g., an RRC Setup message) transmitted by the MgNB to the UE before transmitting the first RRC message (e.g., RRC Reconfiguration message) to the UE. In another example, the UE 110 establishes the SRB (e.g., SRB 0) without receiving an RRC message from the base station 120.

In some implementations, the base station 120 as illustrated in FIG. 4 may be a secondary gNB (SgNB). The SgNB, at times, transmits the first RRC message as illustrated at 405 to the UE 110 using a master base station (e.g., a MgNB, a master eNB or a master next generation eNB (Mng-eNB)). In other words, the master base station includes the first RRC message received from the SgNB in a second RRC message and transmits the second RRC message to the UE, (e.g., on an SRB (e.g., SRB 1)). In this case, the second RRC message transmitted by the master base station includes the first RRC message from the secondary gNB. Similarly, the master base station sometimes receives a second RRC complete message from the UE 110 on the SRB responsive to the second RRC message. The UE 110 may include the first RRC complete message as described at 415 in the second RRC complete message and the master base station sends the first RRC complete message to the SgNB. In other implementations, the SgNB directly transmits the first RRC message to the UE 110 on the SRB (e.g., SRB 3) with the UE, and the SgNB receives the first RRC complete message directly from the UE on the SRB.

In some implementations, the base station 120 as illustrated in FIG. 4 may be a target gNB in a handover of the UE 110. The target gNB transmits the first RRC message as illustrated at 405 to the UE 110 using a source gNB in the handover. In some implementations, the target gNB receives a Handover Request message from the source gNB connecting to the UE. The target gNB transmits the first RRC message to the source gNB in a Handover Request Acknowledge message and sends the Handover Request Acknowledge message to the source gNB responsive to the Handover Request message. The source gNB then transmits the first RRC message to the UE 110, and the UE 110 transmits the first RRC complete message as illustrated at 415 to the target gNB. Thereafter, the UE implements (e.g., enables or disables) the SUTD function in accordance with the SUTD field contained in the first RRC message.

If the base station 120 (e.g., a gNB base station) transmits the SUTD field set to "true" to the UE 110, as in the first variation described above, in operation the base station 120 detects when the UE 110 skips an uplink transmission. With the SUTD field set to "true," the programming will direct the Media Access Control (MAC) entity of the UE 110 to skip an uplink transmission, that is, to refrain from generating or transmitting to the gNB base station a MAC PDU under certain circumstances (e.g., when the UE data buffer of the CRM 212 in FIG. 2 has no data to transmit), which are discussed in more detail below. With the SUTD field set to "true," when the base station 120 detects that the UE 110 skips an uplink transmission, the base station 120 does not transmit an uplink grant ("transmission grant") to the UE 110 to prompt the UE 110 to send a retransmission or a new transmission. Conversely, when the base station 120 (e.g., a gNB base station) subsequently detects that the UE 110 sends a next transmission, the base station 120 transmits an uplink grant to the UE 110 to prompt the UE 110 to send a retransmission or a new transmission, to assure that the data of the next transmission is properly received. This helps prevent the problem of erroneous retransmission requests, as discussed above.

If the base station 120 (e.g., a gNB base station) transmits the SUTD field set to "false" to the UE 110, and does not receive a transmission indicated by an uplink grant or a configured uplink grant, the base station 120 sometimes transmits an uplink grant to the UE 110 as a way to prompt the UE 110 to send a retransmission or a new transmission.

The first RRC message as described at 405 can include the SUTD field for a cell group (CG) (e.g., a master CG (MCG) or a secondary CG (SCG)). The UE 110 determines to enable or disable (and/or not support) the skip transmission function for the CG according to the SUTD field. For instance, when the value of the SUTD field is "true", the UE 110 enables the skip uplink transmission function for the CG. In this case, the programming of the UE 110 directs the MAC entity of the UE 110 associated to the CG to skip an uplink transmission and refrain from generating or transmitting, to the gNB base station 120, a MAC PDU, such as in certain circumstances and/or under a set of conditions as discussed above. As another example, when the value of the SUTD field is set to "false", the UE 110 disables and/or does not support the skip uplink transmission function for the CG. In this case, the programming of the UE 110 directs the MAC entity of the UE 110 associated to the CG to not skip an uplink transmission of a MAC PDU to the gNB when certain circumstances or a set of conditions occur, as discussed above. In both cases, the base station 120 recognizes and operates in accordance with the configuration of the network-set SUTD field.

Whenever the skip uplink transmission function is enabled (i.e., the UTD field is set to true by the gNB), a MAC entity (e.g., MAC layer 308 in FIG. 3) of the UE 110, which is communicatively coupled with the CG, will not generate or transmit (e.g., will refrain from generating or transmitting) a MAC PDU for the CG if the following set of conditions occur and/or are satisfied:

- the MAC entity has an uplink grant addressed to a C-RNTI of the UE, or a configured uplink grant; and
- there is no aperiodic Channel State Information (CSI) requested for a Physical Uplink Shared Channel (PUSCH) transmission; and
- the MAC PDU includes zero media access control service data units (MAC SDUs), if the MAC PDU is generated; and
- the MAC PDU includes only a periodic Buffer Status Report (BSR) (if the MAC PDU is generated) and there is no data available for any Logical Channel Group (LCG), or the MAC PDU includes only a padding BSR (if the MAC PDU is generated).

Stated differently, in response identifying that the SUTD field is set to "true", and identifying when the above set of conditions occur, the UE 110 generates and transmits a MAC PDU to the base station 120 only when the UE buffer (e.g., of the CRM 212 in FIG. 2) contains data for transmission.

If the MAC entity of the UE 110 has an uplink grant addressed to a C-RNTI of the UE 110 or a configured uplink grant and the UE 110 disables and/or does not support the skip uplink transmission function for the CG, the MAC entity of the UE 110 generates a MAC PDU. The MAC entity of the UE 110 transmits the MAC PDU in time and frequency resource(s) indicated in the uplink grant or the configured uplink grant. If the UE has no data to transmit through the CG to the gNB, the MAC PDU includes zero media access control service data units (MAC SDUs) and includes only a periodic BSR or a padding BSR. Otherwise, the UE includes one or more MAC SDUs.

Figure 5:
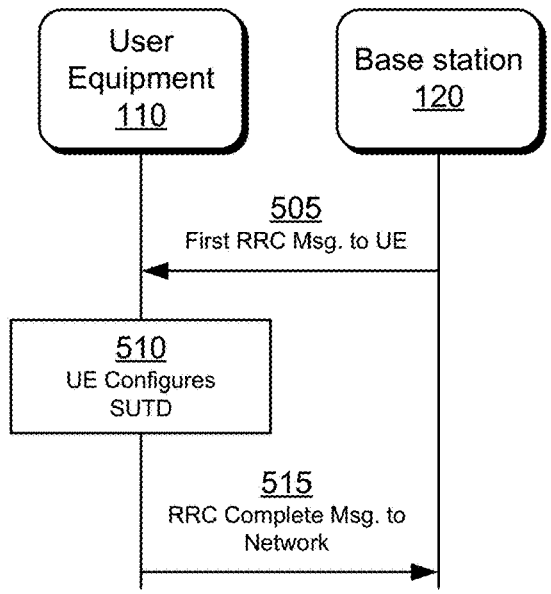
FIG. 5 illustrates an example signaling and control transaction diagram for handling uplink transmissions in a 5G NR system, in which, after receiving a first RRC message from a base station (e.g., a gNB base station), a UE configures the SUTD field, and returns a first RRC complete message returned to the base station including the user-equipment-set SkipUplinkTxDynamic (UE-set SUTD) field.

FIG. 5 illustrates signaling and transaction diagram 500 for uplink transmission in a 5G NR system that provides a UE-controlled solution for problem one mentioned above, regardless of which interpretation (Interpretations 1, 2, or 3) of the 3GPP standards is applied. In implementations, the diagram 500 illustrates transactions performed in a network (e.g., network 140).

As shown, at 505, the UE 110 receives, from the base station 120 (e.g., a gNB base station), a first RRC message, such as an RRC Setup message, an RRC Reconfiguration message, or an RRC Resume message. In implementations, the first RRC message includes a network-set SUTD field for a cell group (CG) (e.g., a master CG (MCG) or a secondary CG (SCG)).

In implementations, regardless of the value of the SUTD field contained or included in the first RRC message (e.g., regardless of whether the SUTD field is set to "true" or "false"), the UE 110 sets or configures a user-equipment-set SkipUplinkTxDynamic (UE-set SUTD) field at configuration at 510. If the value of the UE-set SUTD field is "true", the UE 110 enables the skip uplink transmission function for the CG. In this case, the programming of the UE 110 directs the MAC entity of the UE to skip an uplink transmission and refrain from generating or transmitting, to the base station, a MAC PDU when a set of conditions and/or certain circumstances occur, such as those described above. If the value of the UE-set SUTD field is set to "false", the UE 110 disables and/or does not support the skip uplink transmission function for the CG. In both cases, the base station 120 recognizes and operates in accordance with the setting of the UE-set SUTD field. For example, at 515, whether set to "true" or "false", the UE 110 transmits the UE-set SUTD field to the base station 120 in a first RRC complete message (e.g., an RRC Setup Complete message, an RRC Reconfiguration Complete message, or an RRC Resume Complete message). The UE 110 and the base station 120 implement the respective skip uplink transmission functions (e.g., enabled or disabled) in accordance with the UE-set SUTD field.

Whenever the skip uplink transmission function is enabled, a MAC entity (e.g., MAC layer 308 in FIG. 3) of the UE 110, which is communicatively coupled with the CG, will not generate or transmit (e.g., will refrain from generating or transmitting) a MAC PDU for the CG if the following set of conditions occur and/are satisfied:
  the MAC entity has an uplink grant addressed to a C-RNTI of the UE, or a configured uplink grant; and
  there is no aperiodic Channel State Information (CSI) requested for a Physical Uplink Shared Channel (PUSCH) transmission; and
  the MAC PDU includes zero MAC SDUs (if the MAC PDU is generated); and
  the MAC PDU includes only a periodic Buffer Status Report (BSR) (if the MAC PDU is generated) and there is no data available for any Logical Channel Group (LCG), or the MAC PDU includes only a padding BSR (if the MAC PDU is generated).

Stated differently, in response identifying that the SUTD field is set to "true", and identifying when the above set of conditions occur, the UE 110 generates and transmits a MAC PDU to the base station 120 only when the UE buffer (e.g., of the CRM 212 in FIG. 2) contains data for transmission. This prevents erroneous retransmission requests as further described above. To illustrate, the base station 120 will not expect transmissions when the set of conditions occur. In various embodiments, if the value of the UE-set SUTD field is different from the network-set SUTD field, the UE-set SUTD field will override the earlier network-set SUTD field, and will control the configuration of the respective skip uplink transmission functions at the UE 110 and the base station 120.

When the UE 110 disables and/or does not support the skip uplink transmission function for the CG (e.g., the SUTD field is set to "false"), the MAC entity (e.g., MAC layer 308 in FIG. 3) of the UE 110 generates a MAC PDU if the MAC entity has an uplink grant addressed to a C-RNTI of the UE 110, or a configured uplink grant. The MAC entity transmits the MAC PDU in time and frequency resource(s) indicated in the uplink grant or the configured uplink grant. The MAC PDU may include zero, one, or more than one MAC SDUs. The MAC PDU may include only a periodic BSR or a padding BSR.

Figure 6:
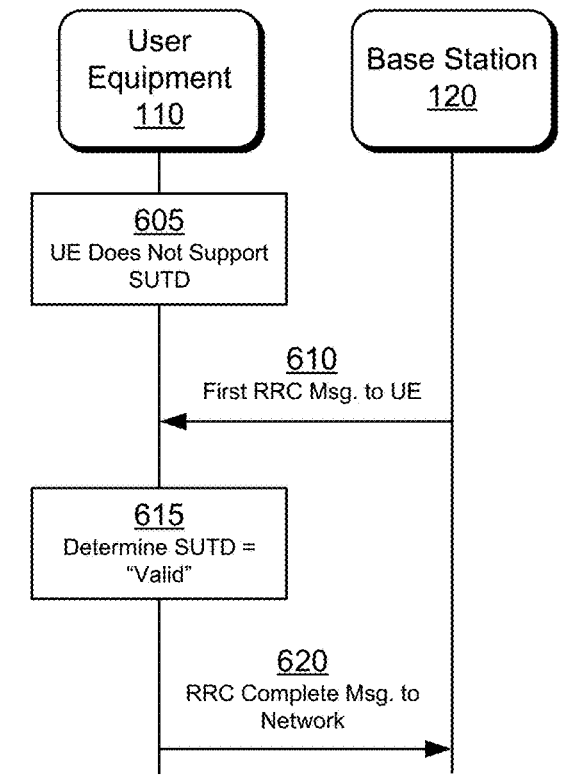
FIG. 6 illustrates an example signaling and control transaction diagram for handling uplink transmission in a 5G NR system, in which a UE does not support the SUTD function, and, after receiving a first RRC message from a base station (e.g., a gNB base station) that includes a network-set SkipUplinkTransmissionDynamic (network-set SUTD) field, the UE returns a first RRC complete message to the base station indicating that the SUTD field is "valid".

FIG. 6 shows a signaling and control transaction diagram 600 for uplink transmission that provides a UE-controlled solution for problem three discussed above. In implementations, the diagram 600 illustrates transactions performed in a network (e.g., network 140).

As shown, at 605, the UE 110 does not support the skip uplink transmission function. At 610, the UE 110 receives a first RRC message from the base station 120 (e.g., a gNB base station), where the first RRC message includes an SUTD field for a cell group (CG) (e.g., MCG or SCG). The UE 110 determines, at 615, that the SUTD field is a valid configuration. The UE 110 can, at times, determine the SUTD field is valid, even though the UE 110 will not implement or enable a skip uplink transmission function due to the UE 110 not supporting the SUTD function. In other words, the UE 110 will not subsequently skip any uplink transmissions indicated in an uplink grant addressed by a C-RNTI of the UE 110 or indicated in a configured uplink grant. More particularly, at 615, the UE 110 determines the first RRC message as a valid RRC message even though the UE 110 does not support the skip uplink transmission function. In response to this determination, at 620, the UE 110 transmits a first RRC complete message to the base station. In one or more implementations, the UE 110 includes an SUTD status indicator in the first RRC complete message. Thereafter, the base station 120 recognizes the skip uplink transmission function status as "valid" in accordance with the "valid" SUTD status indicator.

In another implementation, the UE 110 does not include the SUTD status indicator in the first RRC complete message. When the conditions for skipping the uplink transmission are met as described previously, the UE 110 does not skip an uplink transmission and transmits a MAC PDU to the base station 120. At times, when the base station 120 receives the MAC PDU, the base station 120 detects that the UE 110 does not support the skip uplink transmission function if the MAC PDU does not contain any MAC SDU. In both implementations, the UE 110 neither initiates an RRC connection reestablishment procedure nor an SCG failure information procedure, according to the determination. This prevents the problem of erroneous retransmission requests as described above, because the UE will not skip transmissions since there is no enabled SUTD function.

In some implementations, the UE 110 recognizes the SUTD field as a valid configuration irrespective of the value (e.g., "true" or "false") of the SUTD field (e.g., regardless of whether the SUTD field is set to "true" or "false"). In response to recognizing the SUTD field as a valid configuration, the UE 110 sends a corresponding SUTD status indicator. In other implementations, the UE 110 recognizes the SUTD field as a valid configuration if the SUTD is set to "false," and as an invalid configuration if it is set to "true", and sends a corresponding SUTD status indicator to the base station 120. In scenarios in which the base station 120 corresponds to an MCG, and the SUTD field is set to "true" for the MCG, the UE 110 can initiate an RRC connection reestablishment procedure. Alternately or additionally, in scenarios in which the base station 120 corresponds to an SCG, and the SUTD field is set to "true" for the SCG, the UE 110 can initiate an SCG failure information procedure.

In some implementations, the first RRC message sent at 605 includes a configuration other than the SUTD field as an invalid configuration. In these situations, the UE 110 will transmit, at 620 and to the base station 120, an RRC complete message that includes an "invalid" status indicator. If the configuration is for the MCG and the UE 110 determines the configuration other than the SUTD field as an invalid configuration, the UE 110 can initiate the RRC connection reestablishment procedure. If the configuration is for the SCG and the UE 110 determines the configuration other than the SUTD field as an invalid configuration, the UE can then initiate the SCG failure information procedure.

Upon initiating the RRC connection reestablishment procedure, the UE 110 transmits an RRC reestablishment request message to the base station 120 and/or another base station the network. Upon initiating the SCG failure information procedure, the UE transmits a SCG Failure Information message to another base station, such as another gNB, an eNB or an ng-eNB.

Figure 7:
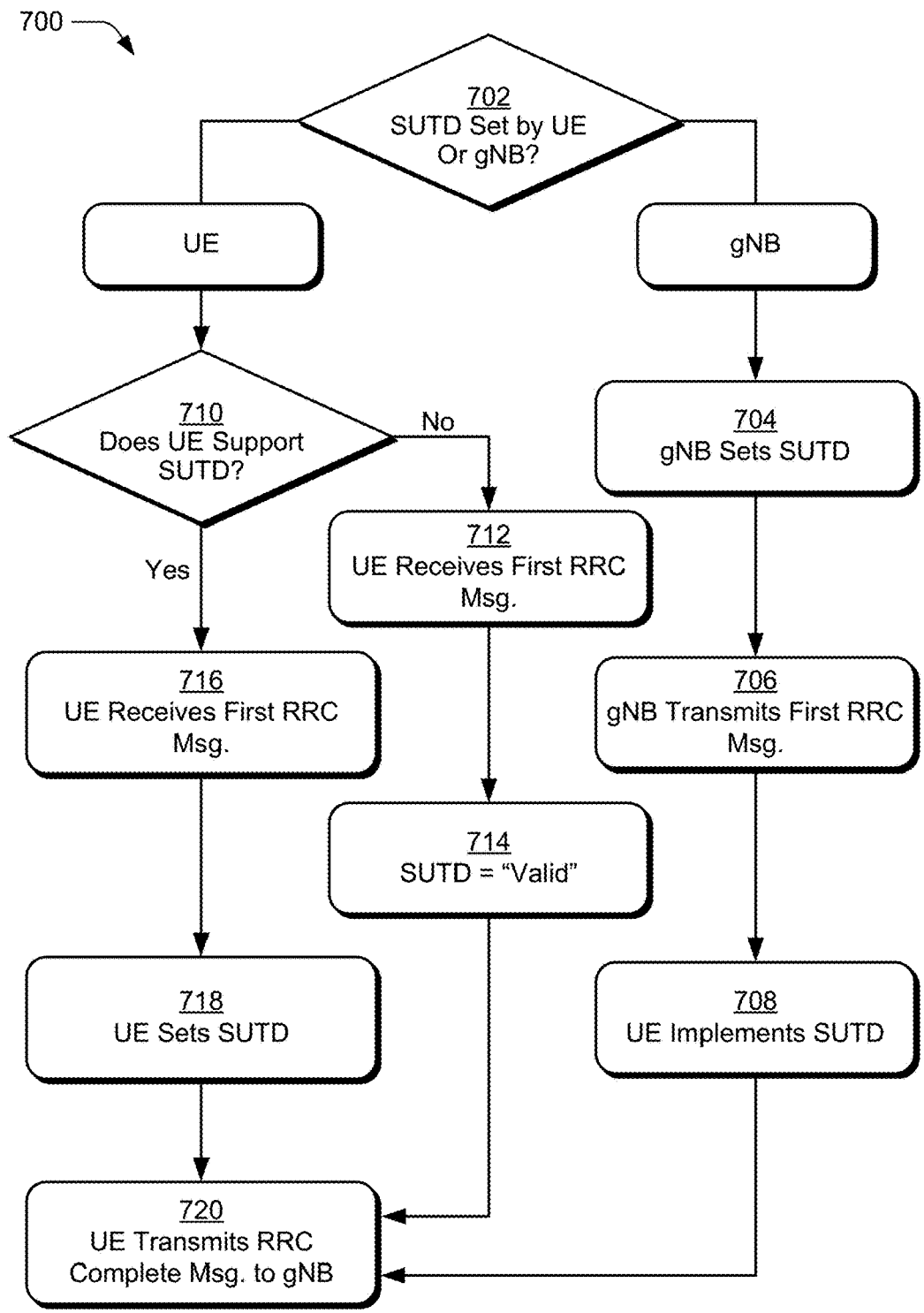
FIG. 7 is a flowchart illustrating example steps for handling uplink transmissions in accordance with one or more embodiments.

FIG. 7 shows a flowchart illustrating the logical steps in an example method 700 for handling uplink transmissions in a 5G NR system in accordance with the present disclosure, whether governed by a UE or a gNB. In the method shown, the first consideration 702 is whether the SUTD is to be set by the UE or the gNB. If the SUTD field is to be set by the gNB, the gNB at step 704 sets the SUTD field in accordance with the criteria discussed above, then transmits a first RRC message at 706. In this approach, the UE will implement (e.g., enable or disable) the SUTD function in accordance with the SUTD field contained in the first RRC message, as indicated at 708, and the UE will transmit a first RRC complete message back to the gNB, as indicated at 720.

Alternatively, if the SUTD field is to be or can be set by the UE, the first inquiry is whether the UE supports the SUTD function, as indicated at 710. If not, the UE will receive the first RRC message from the gNB, as indicated at 712, and determine that the SUTD field is "valid" at step 714, in accordance with the criteria discussed above. The UE will then transmit a first RRC complete message back to the gNB, as indicated at 720, the RRC complete message including a "valid" SUTD status indicator. Alternatively, if the first RRC message does not include an SUTD field or includes some other configuration, the RRC complete message can include an "invalid" SUTD status indicator.

On the other hand, if the SUTD field is to be set by the UE and the UE supports the SUTD function, as indicated at 710, the UE will receive the first RRC message from the gNB, as indicated at 716, and then set the SUTD field, as indicated at 718, in accordance with the criteria discussed above with respect to FIG. 5. The UE will then transmit a first RRC complete message back to the gNB, as indicated at 720, this message including the SUTD value set by the UE.

Variations

Alternatively or in addition to the examples, aspects, and implementations described above, the methods may include variations for uplink transmission in a 5G NR system.

In one variation, a UE-controlled skip uplink transmission function between a wirelessly-connected UE and a gNB is set by the UE: receiving a first RRC message from the gNB, the first RRC message containing an SUTD field governing whether the UE can adopt the skip uplink transmission function; transmitting an RRC complete message to the gNB including an SUTD status indicator; and implementing the skip uplink transmission function in accordance with the SUTD field. Furthermore, the UE may set the skip uplink transmission function by refraining from generating or transmitting to the gNB base station a MAC PDU. This refraining can, in some sub-variants, be when any one, two, three, or all of the following occur: 1) a transmission grant from the gNB base station to the UE is addressed to a C-RNTI, or is a configured uplink grant, or the SUTD field is set to "true" and the transmission grant is addressed to a C-RNTI; 2) there is no aperiodic CSI report requested for the transmission; 3) the MAC PDU includes no MAC SDUs; or 4) the MAC PDU includes only a periodic Buffer Status Report (BSR) and there is no data available for a Logical Channel Group (LCG) or the MAC PDU includes only a Padding BSR.

Example Methods

Example methods 800 and 900 are described with reference to FIG. 8 and FIG. 9 in accordance with one or more aspects of handling uplink transmissions in a 5G NR system. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
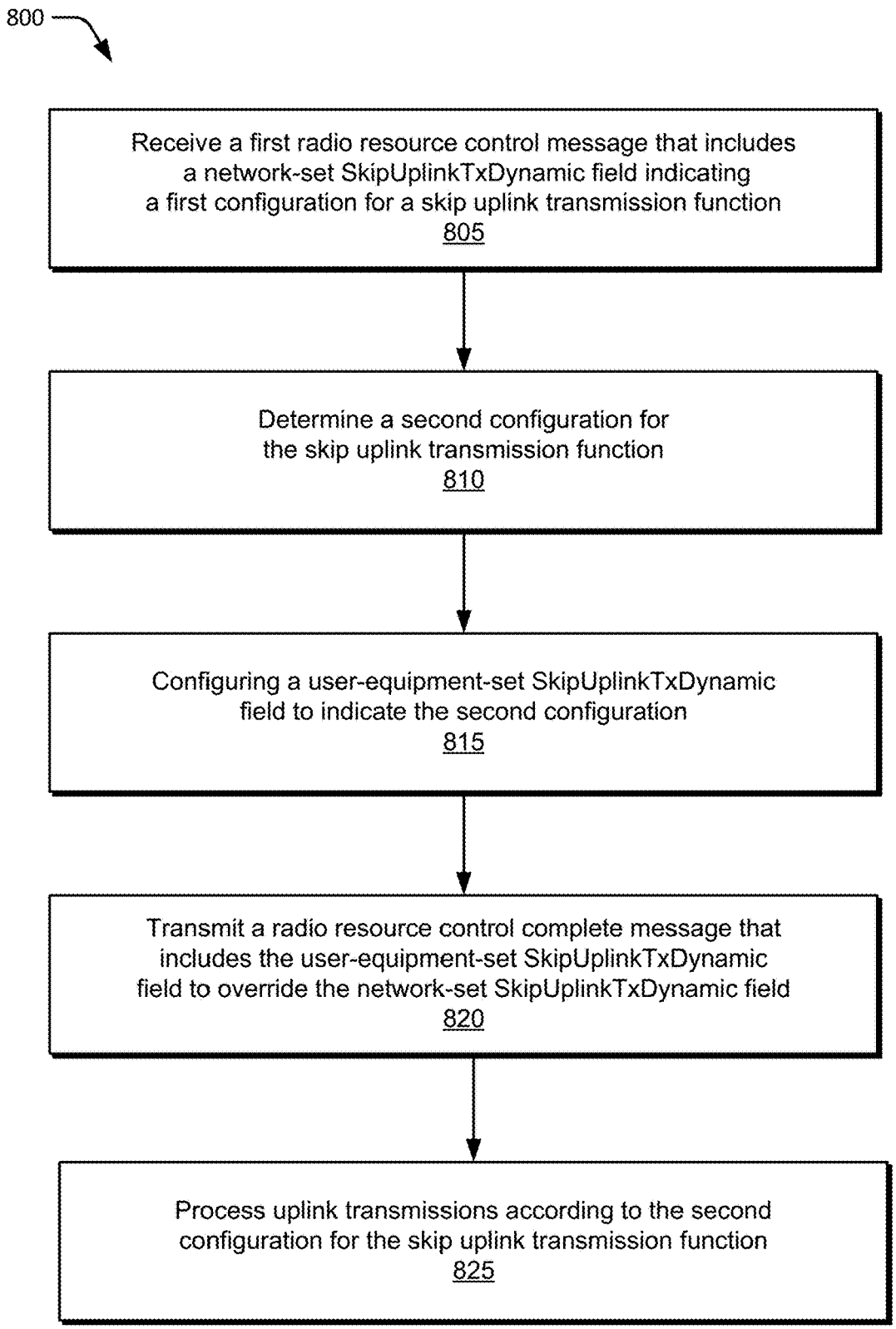
FIG. 8 illustrates an example method in accordance with various aspects of handling uplink transmission in a 5G NR system.

FIG. 8 illustrates an example method 800 for handling uplink transmissions in a 5G NR system. In some implementations, operations of method 800 are performed by a user equipment, such as UE 110 of FIG. 1.

At 805, the UE receives a first radio resource control message (RRC message) that includes a network-set SkipUplinkTxDynamic (network-set SUTD) field indicating a first configuration for a skip uplink transmission function. For example, the UE (e.g., UE 110) receives the first RRC message from the base station 120 of FIG. 1, such as an RRC Setup message, an RRC Reconfiguration message, or an RRC Resume message as described at 505 of FIG. 5. In implementations, the RRC Setup message, the RRC Reconfiguration message, or the RRC Resume message includes the network-set SUTD field.

At 810, the UE determines a second configuration for the skip uplink transmission function. For example, as described at 510 of FIG. 5, the UE (e.g., UE 110) determines the second configuration regardless of the first configuration indicated by the network-set SUTD field. Thus, the second configuration can be the same as the first configuration or can be different from the first configuration.

At 815, the UE configures a user-equipment-set SkipUplinkTxDynamic (UE-set SUTD) field to indicate the second configuration. For instance, the UE (e.g., UE 110) sets the UE-set SUTD field to "true" to enable the skip uplink transmission function or "false" to disable the skip uplink transmission function. In implementations, the UE configures a UE-set SUTD field that is included in a radio resource control (RRC) complete message.

At 820, the UE transmits a radio resource control complete message (RRC complete message) that includes the UE-set SUTD field to override the network-set SUTD field. For example, as described at 515 of FIG. 5, the UE (e.g., UE 110) transmits the RRC complete message, such as an RRC Setup Complete message, an RRC Reconfiguration Complete message, or an RRC Resume Complete message, to the base station 120 of FIG. 1. In implementations, the RRC complete message includes the UE-set SUTD field configured at 815.

At 825, the UE processes uplink transmissions using the second configuration for the skip uplink transmission function. The UE (e.g., UE 110), for instance, generates and transmits a media access control protocol data unit, MAC PDU, to the base station 120 only when a user equipment memory buffer includes data to be transmitted to the base station and the UE-set SUTD is set to true. Alternately or additionally, when the UE-set SUTD is set to true, the UE 110 refrains from generating and transmitting the media access control protocol data unit to the base station 120 when a set of conditions occur. For instance, in some implementations, the occurrence of set of conditions corresponds to (1) a transmission grant is addressed to a cell radio network temporary identifier, C-RNTI, of the user equipment or is a configured uplink grant, (2) there is no aperiodic Channel State Information, CSI, report requested for a particular physical uplink shared channel transmission, (3) the media access control protocol data unit includes zero media access control service data units, MAC SDUs, and (4) the media access control protocol data unit includes only a periodic buffer status report, BSR, and there is no data available for any Logical Channel Group, LCG, or the media access control protocol data unit includes only a padding buffer status report. In implementations, the transmission grant or the configured uplink grant is indicated to a hybrid automatic repeat request, HARQ.

In implementations, when the UE-set SUTD is set to false, the UE (e.g., UE 110) processes the uplink transmissions based on the second configuration by disabling and/or not supporting the skip uplink transmission function. Alternately or additionally, when the UE-set SUTD is set to false, the skip uplink transmission function is disabled, and/or the UE does not support the skip uplink transmission function, the UE generates a media access control protocol data unit (MAC PDU) in response to receiving a transmission grant addressed to a cell radio network temporary identifier, C-RNTI, of the user equipment, or receiving a configured uplink grant. The UE also transmits the MAC PDU in a time and frequency resource indicated in the transmission grant or the configured uplink grant. In implementations, the MAC PDU includes one or more media access control service data units (MAC SDUs). In some implementations, the MAC PDU includes only a periodic buffer status report or a padding buffer status report. Similar to scenarios in which the UE-set SUTD is set to true, the transmission grant or the configured uplink grant is indicated to a hybrid automatic repeat request, HARQ.

FIG. 9 illustrates an example method 900 for handling uplink transmissions in a 5G NR system. In some implementations, operations of method 900 are performed by a base station, such as any one of the base stations 120 of FIG. 1.

At 905, the base station transmits, to a user equipment, a first radio resource control message that includes a network-set SkipUplinkTxDynamic (network-set SUTD) field indicating a first configuration for a skip uplink transmission function. For example, the base station (e.g., base station 120, a gNB base station) transmits an RRC Setup message, an RRC Reconfiguration message, or an RRC Resume message, to the UE (e.g., UE 110), such as that described at 505 of FIG. 5. In implementations, the RRC Setup message, the RRC Reconfiguration message, or the RRC Resume message includes the network-set SUTD field, where the base station sets the network-set SUTD field to false or true.

At 910, the base station receives, from the user equipment, a radio resource complete message that includes an indicator of a user-equipment-set SkipUplinkTxDynamic (UE-set SUTD) field that specifies a second configuration for the skip uplink transmission function. The base station (e.g., the base station 120, a gNB base station), for instance, receives an RRC Setup Complete message, an RRC Reconfiguration Complete message, or an RRC Resume Complete message from the UE (e.g., UE 110), such as that described at 515 of FIG. 5. In implementations, the RRC Setup Complete message, the RRC Reconfiguration Complete message, or the RRC Resume Complete message includes the UE-set SUTD.

At 915, the base station exchanges communications with the user equipment based on using the second configuration for the skip uplink transmission function. To illustrate, the base station (e.g., the base station 120, a gNB base station), exchanges communications based on configuring the skip uplink transmission function using the second configuration indicated by the UE-set SUTD. In some implementations, the first configuration indicated by the network-set SUTD field is different from the second configuration indicated by the UE-set SUTD field. Thus, the base station exchanges the communications based on using the second configuration for the skip uplink transmission function by overriding the first configuration with the second configuration for governing the skip uplink transmission function configuration used for the exchanging the communications.

Exchanging the communications can include, at times, the base station (e.g., base station 120, a gNB base station) expecting a skipped uplink transmission of at least one media access control protocol data unit (MAC PDU) to a hybrid automatic repeat request from the base station, such as in scenarios where the UE-set SUTD enables the skip uplink transmission function. Alternately or additionally, in response to the expected skipped uplink transmission, exchanging the communications includes the base station refraining from transmitting a retransmission request to the user equipment.

Although aspects for handling uplink transmissions in a 5G NR system have been described in language specific to certain features and/or methods, the subject of the appended claims is not necessarily limited to the specific features or methods described. Rather, the specific features and methods are disclosed as example implementations of the method, and other equivalent features and methods are intended to be within the scope of the appended claims. Further, various different aspects are described, and it is to be appreciated that each described aspect can be implemented independently or in connection with one or more other described aspects.

In the following, several examples are described:

Example 1: A method for configuring a skip uplink transmission function between a user equipment and a base station, the method comprising: receiving, from the base station, a first radio resource control message that includes a network-set SkipUplinkTxDynamic field indicating a first configuration for the skip uplink transmission function; determining, at the user equipment, a user-equipment-set SkipUplinkTxDynamic field that indicates a second configuration for the skip uplink transmission function; transmitting, to the base station, a radio resource complete message that includes an indicator of the user-equipment-set SkipUplinkTxDynamic field to override the network-set SkipUplinkTxDynamic field; and processing, at the user equipment, uplink transmissions using the second configuration for the skip uplink transmission function.

Example 2: The method as recited in example 1, wherein the user-equipment-set SkipUplinkTxDynamic field is set to true, and wherein the processing the uplink transmissions using the second configuration for the skip uplink transmission function comprises: generating and transmitting, to the base station and based on the user-equipment-set SkipUplinkTxDynamic field being set to true, a media access control protocol data unit, MAC PDU, only when a user equipment memory buffer includes data to be transmitted to the base station.

Example 3: The method as recited in example 1 or example 2, wherein the user-equipment-set SkipUplinkTxDynamic field is set to true, and wherein processing the uplink transmissions using the second configuration for the skip uplink transmission function comprises: refraining from generating and transmitting, to the base station and based on the user-equipment-set SkipUplinkTxDynamic field being set to true, a media access control protocol data unit when: a transmission grant is addressed to a cell radio network temporary identifier, C-RNTI, of the user equipment or is a configured uplink grant; there is no aperiodic Channel State Information, CSI, report requested for a particular physical uplink shared channel transmission; the media access control protocol data unit includes zero media access control service data units, MAC SDUs; and the media access control protocol data unit includes only a periodic buffer status report, BSR, and there is no data available for any Logical Channel Group, LCG, or the media access control protocol data unit includes only a padding buffer status report.

Example 4: The method as recited in example 3, wherein the transmission grant or the configured uplink grant is indicated to a hybrid automatic repeat request entity, HARQ entity.

Example 5: The method as recited in example 1, wherein the user-equipment-set SkipUplinkTxDynamic field is set to false, and wherein the processing the uplink transmissions using the second configuration for the skip uplink transmission function comprises: not supporting the skip uplink transmission function.

Example 6: The method as recited in example 5, wherein not supporting the skip uplink transmission function comprises: generating a media access control protocol data unit, MAC PDU, in response to receiving a transmission grant addressed to a cell radio network temporary identifier, C-RNTI, of the user equipment, or receiving a configured uplink grant; and transmitting the media access control protocol data unit in a time and frequency resource indicated in the transmission grant or the configured uplink grant.

Example 7: The method as recited in example 6, wherein the media access control protocol data unit includes: one or more media access control service data units, MAC SDUs.

Example 8: The method as recited in example 6, wherein the media access control protocol data unit includes only a periodic buffer status report or a padding buffer status report.

Example 9. The method as recited in any one of examples 6 to 8, wherein the transmission grant or the configured uplink grant is indicated to a hybrid automatic repeat request entity, HARQ entity, of the user equipment.

Example 10: A method for uplink transmission between a user equipment and a base station, the method comprising: transmitting, to the user equipment, a first radio resource control message that includes a network-set SkipUplinkTxDynamic field indicating a first configuration for a skip uplink transmission function; receiving, from the user equipment, a radio resource complete message that includes an indicator of a user-equipment-set SkipUplinkTxDynamic field that specifies a second configuration for the skip uplink transmission function; and exchanging communications with the user equipment based on using the second configuration for the skip uplink transmission function.

Example 11: The method of example 10, wherein the second configuration for the skip uplink transmission function enables the skip uplink transmission function, and wherein exchanging communications with the user equipment comprises expecting a skipped uplink transmission of at least one media access control protocol data unit to a hybrid automatic repeat request.

Example 12: The method as recited in example 11, wherein exchanging communications with the user equipment based on using the second configuration comprises: refraining, in response to the expected skipped uplink transmission, from transmitting a retransmission request to the user equipment.

Example 13: The method as recited in any one of the examples 10 to 12, wherein the first configuration indicated by the network-set SkipUplinkTxDynamic field is different from the second configuration indicated by the user-equipment-set SkipUplinkTxDynamic field, and wherein exchanging communications with the user equipment based on using the second configuration for the skip uplink transmission function comprises: overriding the first configuration with the second configuration for governing the skip uplink transmission function used for the exchanging the communications.

Example 14: A user equipment apparatus comprising: at least one wireless transceiver; a processor; and computer-readable storage media comprising instructions, responsive to execution by the processor, for directing the user equipment apparatus to perform any one of the methods recited in examples 1 to 9 using the at least one wireless transceiver.

Example 15: A base station apparatus comprising: at least one wireless transceiver; a processor; and computer-readable storage media comprising instructions, responsive to execution by the processor, for directing the base station apparatus to perform any one of the methods recited in examples 10 to 13 using the at least one wireless transceiver.

Example 16: A computer-readable storage medium comprising instructions that, when executed by a processor, cause an apparatus incorporating the processor to perform any one of the methods recited in examples 1 to 13.

What is claimed is:

1. A method performed by a user equipment (UE) for configuring a skip uplink transmission function between the UE and a base station, the method comprising:
  receiving, from the base station, a first radio resource control message;
  determining, at the UE, that the first radio resource control message does not include a specific field associated with configuring the skip uplink transmission function at the UE; and
  in response to determining that the first radio resource control message does not include the specific field, disabling the skip uplink transmission function at the UE.

2. The method as recited in claim 1, further comprising:
  receiving, from the base station, a second radio resource control message;
  identifying, at the UE, that the second radio resource control message indicates to enable the skip uplink transmission function at the UE;

in response to determining that the second radio resource control message indicates to enable the skip uplink transmission function, enabling the skip uplink transmission function at the UE; and communicating with the base station in accordance with the skip uplink transmission function.

3. The method as recited in claim 2, wherein the second radio resource control message includes a skip uplink transmission field set to true, and communicating with the base station further comprises:
refraining from generating and transmitting a media access control protocol data unit when:
a transmission grant is addressed to a cell radio network temporary identifier (C-RNTI) of the UE or is a configured uplink grant;
there is no aperiodic Channel State Information (CSI) report requested for a particular physical uplink shared channel transmission;
the media access control protocol data unit includes zero media access control service data units (MAC SDUs); and
the media access control protocol data unit includes only a periodic buffer status report (BSR) and there is no data available for any Logical Channel Group (LCG) or the media access control protocol data unit includes only a padding buffer status report.

4. The method as recited in claim 3, wherein communicating with the base station further comprises:
generating and transmitting the media access control protocol data unit (MAC PDU) only when a UE buffer includes data to be transmitted to the base station.

5. A method performed by a base station for configuring a skip uplink transmission function between the base station and a user equipment (UE), the method comprising:
configuring, by the base station, a first radio resource control message with a configuration to disable the skip uplink transmission function at the UE by not including, in the first radio resource control message, a specific field associated with configuring the skip uplink transmission function; and
transmitting the first radio resource control message to the UE.

6. The method as recited in claim 5, further comprising:
configuring, by the base station, a second radio resource control message that indicates to enable the skip uplink transmission function at the UE;
transmitting the second radio resource control message to the UE; and
communicating with the UE in accordance with the configuration to enable the skip uplink transmission function.

7. The method of claim 6, wherein communicating with the UE in accordance with the configuration to enable the skip uplink transmission function comprises:
recognizing that a skipped uplink transmission of a media access control protocol data unit to a hybrid automatic repeat request is in accordance with a set of conditions that direct the UE to refrain from generating or transmitting the media access control protocol data unit; and
refraining, in response to recognizing the skipped uplink transmission is in accordance with the configuration to enable the skip uplink transmission function, from transmitting a retransmission request to the user equipment.

8. The method of claim 1, further comprising:
communicating with the base station in accordance with disabling the skip uplink transmission function.

9. The method of claim 5, further comprising:
communicating with the UE in accordance with the configuration to disable the skip uplink transmission function.

10. The method as recited in claim 1, wherein the first radio resource control message is an RRC Reconfiguration message.

11. The method as recited in claim 2, wherein the second radio resource control message is another RRC Reconfiguration message.

12. The method as recited in claim 5, wherein the first radio resource control message is an RRC Reconfiguration message.

13. The method as recited in claim 6, wherein the second radio resource control message is another RRC Reconfiguration message.

14. A user equipment comprising:
at least one wireless transceiver;
a processor; and
computer-readable storage media comprising instructions, responsive to execution by the processor, for directing the user equipment (UE) to:
receive, from a base station, a first radio resource control message;
determine that the first radio resource control message does not include a specific field associated with configuring a skip uplink transmission function at the UE; and
in response to the determination that the first radio resource control message does not include the specific field, disable the skip uplink transmission function at the UE.

15. The user equipment of claim 14, the instructions further executable to direct the user equipment to:
communicate with the base station in accordance with disabling the skip uplink transmission function.

16. The user equipment of claim 14, the instructions further executable to direct the user equipment to:
receive, from the base station, a second radio resource control message;
identify that the second radio resource control message indicates to enable the skip uplink transmission function at the UE;
in response to the determination that the second radio resource control message indicates to enable the skip uplink transmission function, enable the skip uplink transmission function at the UE; and
communicate with the base station in accordance with the skip uplink transmission function.

17. The user equipment of claim 16, wherein the second radio resource control message includes a skip uplink transmission field set to true, and the instructions to communicate with the base station further direct the user equipment to:
refrain from generating and transmitting a media access control protocol data unit when:
a transmission grant is addressed to a cell radio network temporary identifier (C-RNTI) of the UE or is a configured uplink grant;
there is no aperiodic Channel State Information (CSI) report requested for a particular physical uplink shared channel transmission;
the media access control protocol data unit includes zero media access control service data units (MAC SDUs); and
the media access control protocol data unit includes only a periodic buffer status report (BSR) and there is no data available for any Logical Channel Group (LCG) or the media access control protocol data unit includes only a padding buffer status report.

18. The user equipment of claim 17, wherein the instructions to communicate with the base station further direct the user equipment to:
generate and transmit the media access control protocol data unit (MAC PDU) only when a UE buffer includes data to be transmitted to the base station.

19. The user equipment of claim 14, wherein the first radio resource control message is an RRC Reconfiguration message.

20. The user equipment of claim 16, wherein the second radio resource control message is another RRC Reconfiguration message.

21. A base station comprising:
at least one wireless transceiver;
a processor; and
computer-readable storage media comprising instructions, responsive to execution by the processor, for directing the base station to:
configure a first radio resource control message with a configuration to disable a skip uplink transmission function at a user equipment (UE) by not including, in the first radio resource control message, a specific field associated with configuring the skip uplink transmission function; and
transmit the first radio resource control message to the UE.

22. The base station of claim 21, the instructions further executable to direct the base station to:
communicate with the UE in accordance with the configuration to disable the skip uplink transmission function.

23. The base station of claim 21, the instructions further executable to direct the base station to:
configure a second radio resource control message that indicates to enable the skip uplink transmission function at the UE;
transmit the second radio resource control message to the UE; and
communicate with the UE in accordance with the configuration to enable the skip uplink transmission function.

24. The base station of claim 23, wherein the instructions to communicate with the UE in accordance with the configuration to enable the skip uplink transmission function are executable to direct the base station to:
recognize that a skipped uplink transmission of a media access control protocol data unit to a hybrid automatic repeat request is in accordance with a set of conditions that direct the UE to refrain from generating or transmitting the media access control protocol data unit; and
refrain, in response to recognizing the skipped uplink transmission is in accordance with the configuration to enable the skip uplink transmission function, from transmitting a retransmission request to the user equipment.

25. The base station of claim 21, wherein the first radio resource control message is an RRC Reconfiguration message.

26. The base station of claim 23, wherein the second radio resource control message is another RRC Reconfiguration message.

* * * * *